Figure 1:
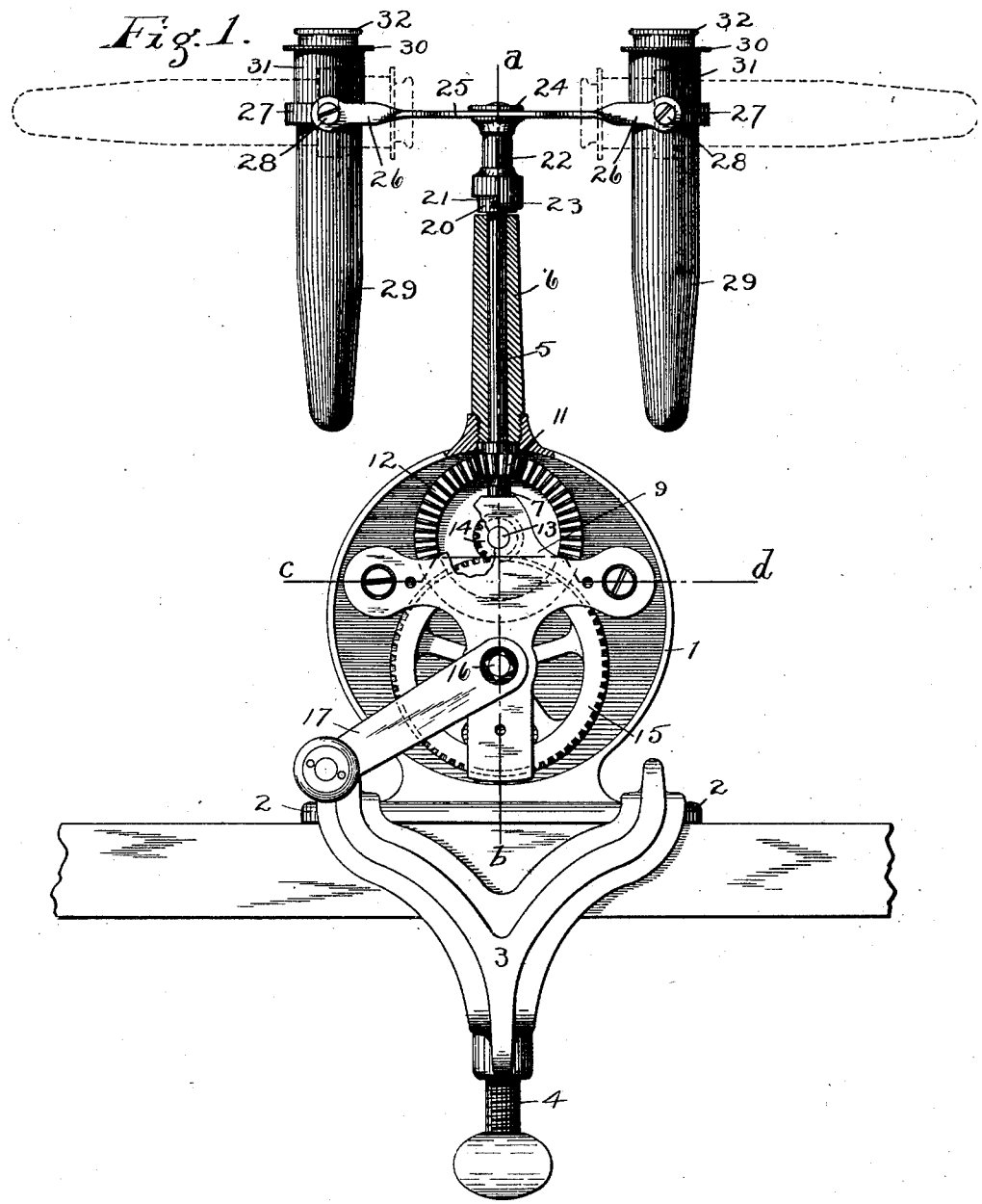

No. 660,746. Patented Oct. 30, 1900.
E. BAUSCH & G. HOMMEL.
CENTRIFUGAL TESTING MACHINE.
(Application filed Mar. 26, 1898.)
(No Model.) 2 Sheets—Sheet 1.

Witnesses
Chas. F. Logan
G. Willard Rich.

Inventors
Edward Bausch
George Hommel
by Church & Church
their Attorneys

No. 660,746. Patented Oct. 30, 1900.
E. BAUSCH & G. HOMMEL.
CENTRIFUGAL TESTING MACHINE.
(Application filed Mar. 26, 1898.)
(No Model.) 2 Sheets—Sheet 2.
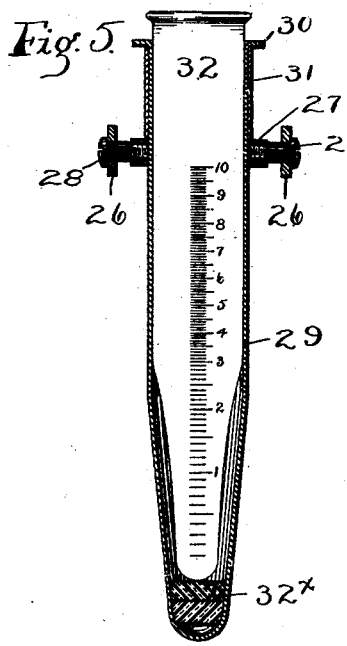
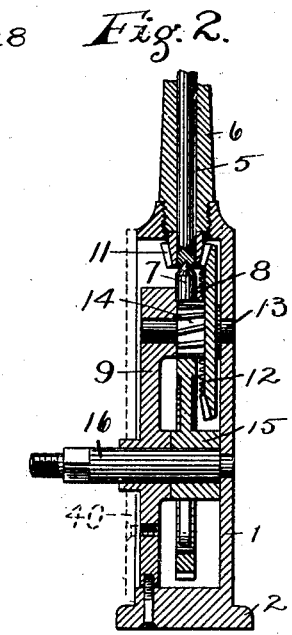
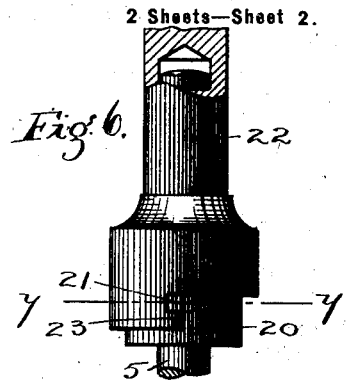
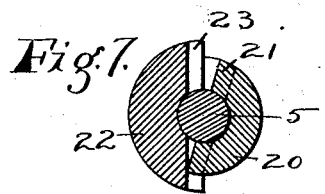
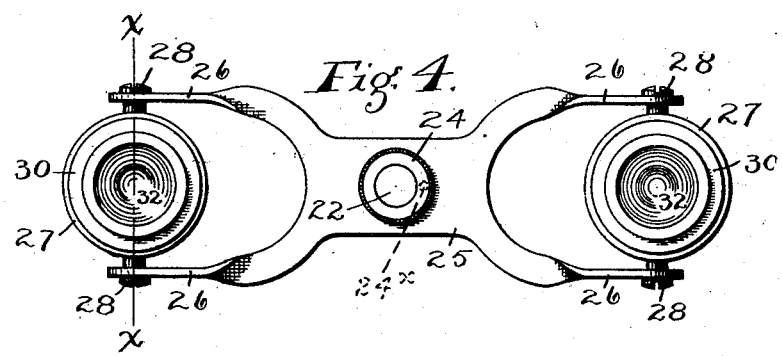
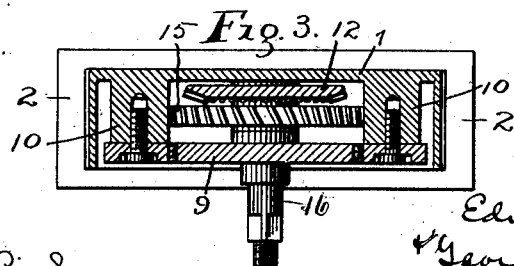
Witnesses.
Chas. F. Logan
G. Willard Rich.
Inventors
Edward Bausch
George Hommel
by Church & Church
Their Attorneys

UNITED STATES PATENT OFFICE.

EDWARD BAUSCH AND GEORGE HOMMEL, OF ROCHESTER, NEW YORK, ASSIGNORS TO THE BAUSCH & LOMB OPTICAL COMPANY, OF SAME PLACE.

CENTRIFUGAL TESTING-MACHINE.

SPECIFICATION forming part of Letters Patent No. 660,746, dated October 30, 1900.

Application filed March 26, 1898. Serial No. 675,331. (No model.)

*To all whom it may concern:*

Be it known that we, EDWARD BAUSCH and GEORGE HOMMEL, of Rochester, in the county of Monroe and State of New York, have invented certain new and useful Improvements in Centrifugal Testing-Machines; and we do hereby declare the following to be a full, clear, and exact description of the same, reference being had to the accompanying drawings, forming a part of this specification, and to the reference-numerals marked thereon.

Our present invention has for its object to provide an improved centrifugal machine particularly adapted for testing milk, urine, blood, or other materials in which the component parts are separated by centrifugal action; and it consists in certain improvements in construction and combinations of parts, all as will be hereinafter fully described, the novel features being pointed out in the claims at the end of this specification.

In the drawings, Figure 1 is a side elevation of a machine embodying our improvements with the cover-plate removed and a portion of the bearing-sleeve in section; Fig. 2, a vertical sectional view on the line *a b* of Fig. 1; Fig. 3, a cross-sectional view on the line *c d* of Fig. 1; Fig. 4, a plan view of the tube-holder; Fig. 5, a vertical sectional view on the line *x x* of Fig. 4; Fig. 6, a detail view of a clutch device between the rotary head and spindle; Fig. 7, a sectional view of the same on the line *y y* of Fig. 6.

In carrying out our invention we provide a main frame or casing 1, adapted to contain the operating parts and having the lateral extensions or feet 2, with which latter coöperate the arms of a removable yoke or bracket 3, having a clamping-screw 4, by which the device as a whole may be detachably clamped to a table or support. The casing is shown in Fig. 1 open at one side; but it is preferably provided with a cover 40, as shown in Fig. 2, and arranged within this casing is the operating-gearing for rapidly rotating the vertical spindle 5, arranged within the tubular extension 6, screwing into the top of the casing. The lower end of the spindle 5 has a bearing on the upper pointed end of a stud 7, secured upon the upper horizontal arm 8 of a gear-supporting frame 9, arranged within the casing. This frame 9 is composed of a plate or casting secured to the ends of pillars or posts 10, formed on the casing, so that the gearing is preferably maintained between said frame 9 and the rear side of the casing. The lower end of the spindle 5 is provided with a beveled pinion 11, meshing with a corresponding larger gear 12, mounted on an arbor 13, journaled at one end in the casing and at the other in the frame 9, and also secured to said arbor 13 is a pinion 14, having spiral teeth and meshing with a larger gear 15, also having spiral teeth and secured to the arbor 16, which is also journaled in the casing and the frame 9. At the outer end of this arbor 16 is an operating-handle 17, by which the gears may be operated, and the relative sizes and arrangement of the gears are such that the spindle may be rotated at great speed. Secured to the upper portion of the spindle is a collar 20, provided with an overhanging flange 21, extending transversely of the spindle, and the spindle is extended somewhat above this collar and adapted to project into a recess or socket in a removable head 22, which carries the tubes or receptacles for the material to be tested. The lower side of this head or sleeve is provided with a flange 23, adapted when the head is in place on the spindle to coöperate with the flange 21 and lock the head to the spindle during the rotation of the latter, said flanges being so relatively constructed that the head may be applied to the spindle and permit the two flanges to pass each other, and by the rotation of the head in either direction the parts will become locked, as shown particularly in Fig. 7.

In the present embodiment of our invention when the machine is to be used for testing milk, sputum, or urine, where a large quantity of liquid is required to be tested, we attach a plate 25 to the head by means of the threaded projection and nut 24 operating thereon, and, if desired, a steadying-pin 24× may be employed to secure the parts, or the projection and the aperture in the plate may be angular, as will be understood, said plate having bifurcated ends, the outer portions being twisted or turned into a vertical plane, as shown particularly in Figs. 1 and 4, so as to afford stiff arms 26 for the reception of the pivots or trunnions supporting the holders for the test-tubes. These carriers each consist of a ring 27, loosely pivoted upon the arms 26 by means of the screws 28, as shown particularly in Fig. 5, through which rings pass the tube-holders 29, preferably constructed of metal and having the flange 30 at the upper end, between which and the rings 27 are arranged loose collars 31. 32 indicates the graduated test-tubes adapted to be inserted within the containers 29 and preferably resting upon the elastic plugs or blocks 32$^\times$ in the lower ends thereof. The plate 25 may be removed from the head, if desired, and other forms or sizes applied thereto.

The employment of the collars or sleeves 31 between the top of the tube-holder 29 and the pivoted ring is to permit the use of comparatively long test-tubes without extending the spindle and tubular support 6, so that there is no liability of the lower ends of the tubes or containers striking the casing when the spindle is rotated at slow speed or is at rest.

As usual, the samples of liquid to be tested are placed in the tubes and the latter placed within the containers, and then the spindle is rotated at a high speed by operating the handle 17 in the usual manner, whereby all the heavier materials or deposits are thrown to the extreme ends of the tubes by centrifugal action and a proportional analysis is enabled to be made.

The construction of the casing and the frame carrying the gearing is very simple and enables us to make and assemble the parts very easily, and the employment of spiral-toothed gears in devices of this description between the operating-handle and the vertical shaft is a decided advantage, as the movement of the head is thereby rendered smooth and uniform, particularly in starting the device from a position of rest, and the liability of jarring the tubes, particularly in slowing down, is reduced to a minimum, as there is no opportunity of backlash in the gears operating on parallel axes.

We claim as our invention—

1. In a centrifugal machine, the combination with the vertical shaft, of the head on the shaft, the plate on the head having the bifurcated ends, the arms thus formed being turned with their edges projecting vertically, and the tube-holders hung loosely between said arms, substantially as described.

2. In a centrifugal testing-machine, the head for the tube-carriers embodying the plate formed with the twisted arms at the ends projecting edgewise vertically, the rings, the screws passing through the arms and engaging the rings and the removable tube-holders extending through the rings and having the flanges engaging the rings, substantially as described.

3. In a centrifugal testing-machine, the combination with the casing, having the gearing therein and the tubular extension, the vertical shaft in the extension, the head thereon having pairs of arms, and the rings hung loosely between them, of the tube-holders having the flanges at their upper ends, the test-tubes in the holders, and the removable collars 31 encircling the tubes and arranged between the flanges thereon and the rings, substantially as described.

4. In a centrifugal testing-machine, the combination with the vertical shaft, the head having the socket upon one extremity, the threaded projection upon the other, the nut on the projection and interlocking devices between the head and shaft, of the flat plate removably connected to the threaded projection on the head having the arms at the ends twisted or turned vertically, and the tube-holders pivoted between said arms, substantially as described.

5. In a testing-machine, the combination with a rotary spindle, and a head 22 removably secured thereto, having the threaded extension and the nut thereon, of a flat plate 25 mounted upon the extension and secured by the nut, having the arms 26 at the ends formed integral with the plate and bent to a plane at right angles to that of the latter, the projections 28 and the rings 27 carried thereby.

EDWARD BAUSCH.
GEORGE HOMMEL.

Witnesses:
WM. L. PATTERSON,
L. B. ELLIOTT.